United States Patent
Ghiasi et al.

(10) Patent No.: US 7,386,739 B2
(45) Date of Patent: Jun. 10, 2008

(54) SCHEDULING PROCESSOR VOLTAGES AND FREQUENCIES BASED ON PERFORMANCE PREDICTION AND POWER CONSTRAINTS

(75) Inventors: Soraya Ghiasi, Austin, TX (US); Thomas Walter Keller, Jr., Austin, TX (US); Ramakrishna Kotla, Austin, TX (US); Freeman Leigh Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 11/120,899

(22) Filed: May 3, 2005

(65) Prior Publication Data
US 2006/0253715 A1 Nov. 9, 2006

(51) Int. Cl.
*G06F 1/26* (2006.01)
(52) U.S. Cl. ...................................... 713/300
(58) Field of Classification Search ................. 713/300
See application file for complete search history.

(56) References Cited

U.S. PATENT DOCUMENTS

| | | | | |
|---|---|---|---|---|
| 2005/0055590 A1* | 3/2005 | Farkas et al. | ............... | 713/320 |
| 2005/0132238 A1* | 6/2005 | Nanja | ......................... | 713/300 |
| 2005/0218871 A1* | 10/2005 | Kang et al. | .................. | 323/265 |
| 2005/0262366 A1* | 11/2005 | Ma | ............................. | 713/300 |
| 2006/0168571 A1* | 7/2006 | Ghiasi et al. | ............... | 717/127 |
| 2007/0011476 A1* | 1/2007 | Flautner et al. | ............. | 713/300 |

OTHER PUBLICATIONS

"Characterizing the impact of different memory-intensity levels" Kotla, R.; Devgan, A.; Ghiasi, S.; Keller, T.; Rawson, F. Workload Characterization, 2004. WWC-7. 2004 IEEE International Workshop on, vol., Iss., Oct. 25, 2004 pp. 3-10.*
Kotla et al., "Scheduling Processor Voltage and Frequency in Server and Cluster Systems", IEEE, 0-7695-2312-9/05, pp. 1-8.

* cited by examiner

*Primary Examiner*—Chun Cao
(74) *Attorney, Agent, or Firm*—Duke W. Yee; Cas Salys; Peter B. Manzo

(57) ABSTRACT

A power management system schedules the voltage and frequency of processors in a data processing system based on two criteria. The first criterion is a prediction of the performance that the work currently running on the processor will experience at the different frequencies that are available. The second criterion is a system-wide constraint on the total power budget allocated to processors. Based on these criteria, low-level code sets the frequency and voltage of the processors in the system to match what the operating system is currently running on them.

10 Claims, 4 Drawing Sheets

SCHEDULING PROCESSOR VOLTAGES AND FREQUENCIES BASED ON PERFORMANCE PREDICTION AND POWER CONSTRAINTS

This invention was made with Government support under PERCS, NBCH30390004. THE GOVERNMENT HAS CERTAIN RIGHTS IN THIS INVENTION.

BACKGROUND OF THE INVENTION

1. Technical Field

The present invention relates to data processing and, in particular, to power consumption in servers and server clusters. Still more particularly, the present invention provides a method, apparatus, and program for scheduling processor voltages and frequencies based on performance prediction and power constraints.

2. Description of Related Art

Modern server farm and cluster sites consume large quantities of power both to power and cool the machines in the site. At the same time, less power supply redundancy is offered, and power companies and government officials are requesting that power consumption be reduced during certain time periods. These trends lead to the possible requirement of responding to rapid reductions in the maximum power the site may consume. A range of solutions may exist, but each solution must respond to the new power budget rapidly before causing a cascading failure. The possible techniques include powering down some nodes or slowing all nodes in a system uniformly.

The concern with system-level and central processing unit (CPU) power is now a first-order design constraint across all classes of computing devices. While the primary problem for embedded and laptop computers is battery life and, thus, total energy consumption over time, the most important problem for servers and server clusters is maximum power. See Charles Lefurgy, et al.; "Energy Management for Commercial Servers"; *Computer*; volume 36, number 12, December, 2004; pages 39-48. Server computing environments have limitations on their internal power-delivery and cooling systems as well as installation limits on the total power and cooling available in the external environment. Prior work has led to the development of processor frequency and voltage scaling as a way to reduce processor power, which is often the most important contributor to system-level power consumption. However, in the past, dynamic voltage and frequency scaling have found their primary application in embedded and laptop machines.

Prior art solutions respond to changes in demand, but do so on an application-unaware basis. In these prior art schemes, an increase in CPU utilization leads to an increase in frequency and voltage while a decrease in utilization leads to a corresponding decrease. However, these solutions do not make any use of information about how efficiently the workload uses the processor or about its memory behavior. Instead, they rely on simple metrics like the number of non-halted cycles in an interval of time.

Another prior art solution explores the use of dynamic frequency and voltage scaling in the Linux® operating system with a focus on average power and total energy consumption. See K. Flautner et al.; "Vertigo: Automatic Performance-setting for Linux"; Proceedings of the 5$^{th}$ Symposium on Operating Systems Design and Implementation (OSDI '02); December, 2002; pages 105-116 (LINUX is a registered trademark of Linus Torvalds). The solution examines laptop applications and the interaction between the system and the user to determine the slack due to processor over-provisioning. The solution uses frequency and voltage scaling to reduce power while consuming the slack by running the computation slower. The Vertigo system dynamically uses multiple performance setting algorithms to reduce energy.

Yet another solution extends the ideas found in the Vertigo system to the domain of web server farms. The solution explores the use of dynamic voltage scaling to respond to changes in server demands. The solution also examines the use of request batching to gain larger reductions in power during periods of low demand. The above techniques compliment one another, but do not provide a means to address peak power.

SUMMARY OF THE INVENTION

The present invention recognizes the disadvantages of the prior art and contributes to solving the power and thermal problems of large-scale and dense server systems by providing a way to manage certain processor implementation characteristics that directly affect power and heat. The present invention schedules the voltage and frequency of processors in the system based on two criteria. The first criterion is a prediction of the processor demand of the work currently scheduled by the operating system on the processor. The second criterion is a system-wide constraint on the total power budget allocated to processors. Based on these criteria, low-level code sets the frequency and voltage of the processors in the system to match the execution characteristics of the work currently executing on them. This setting is constrained so that the total power remains below a given, possibly changing, limit.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
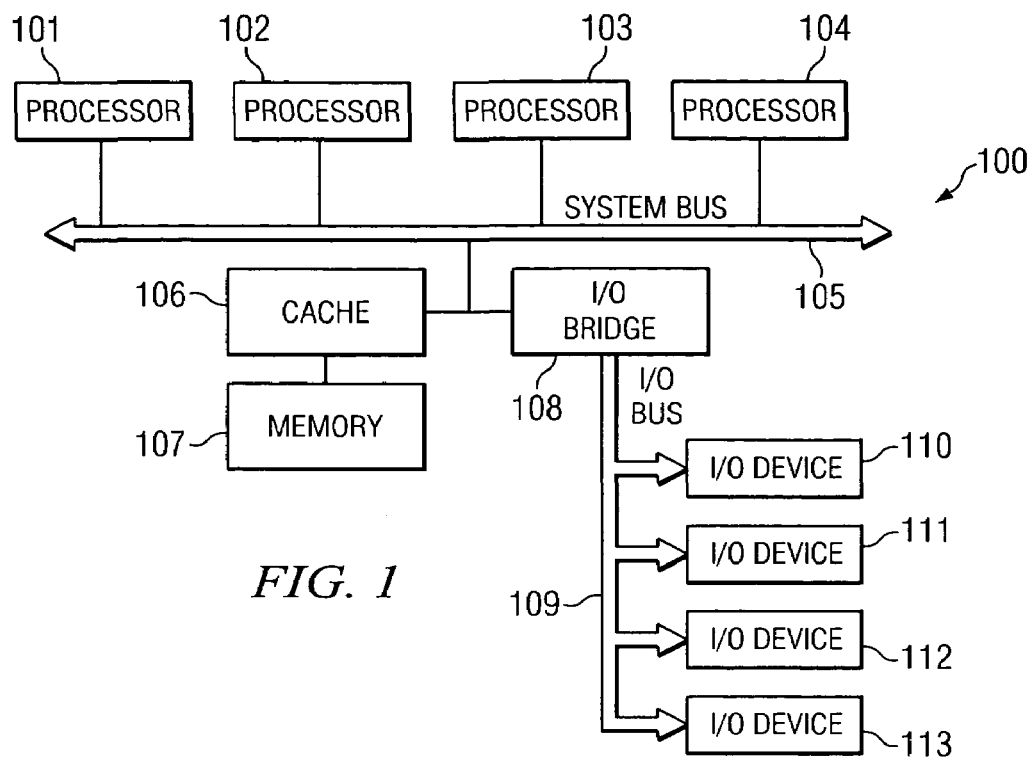
FIG. 1 is a block diagram of a data processing system in which the present invention may be implemented.
Figure 3:
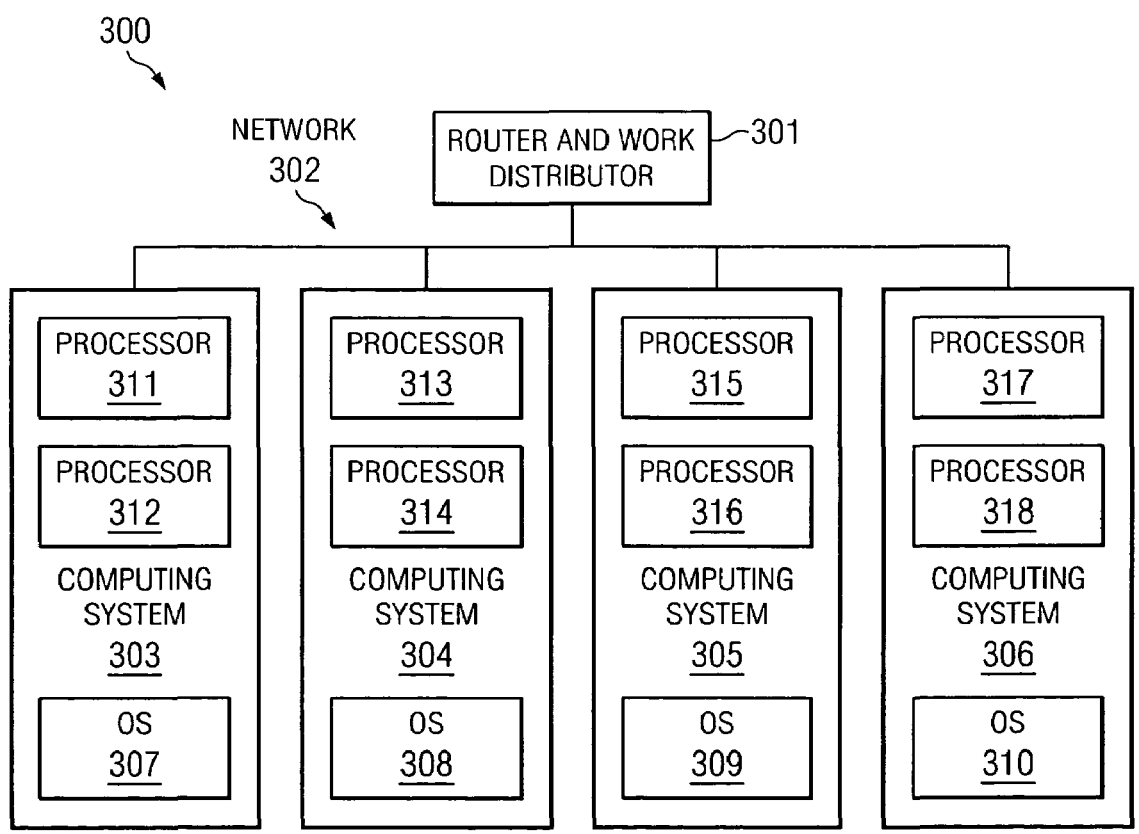
FIG. 3 is a block diagram of an exemplary clustered environment in which the present invention may be implemented.
Figure 2:
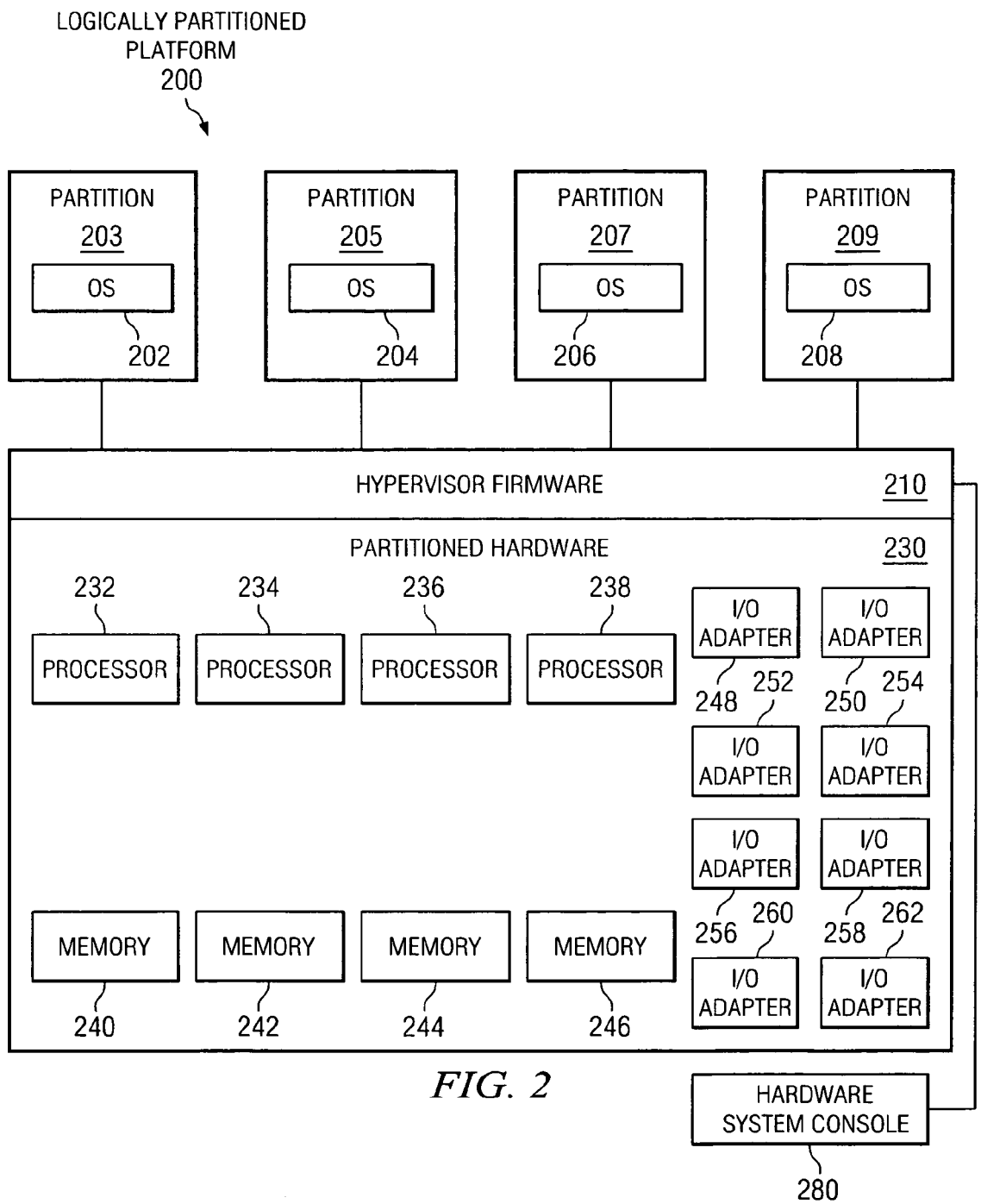
FIG. 2 is a block diagram of an exemplary logical partitioned platform in which the present invention may be implemented.

The present invention provides a method, apparatus and computer program product for scheduling processor voltages and frequencies based on performance prediction and power constraints. The data processing device may be a stand-alone computing device, a cluster of computing devices operating as a single system or a distributed data processing system in which multiple computing devices are utilized to perform various aspects of the present invention. Therefore, the following FIGS. 1, 2, and 3 are provided as exemplary diagrams of data processing environments in which the present invention may be implemented. It should be appreciated that FIGS. 1, 2, and 3 are only exemplary and are not intended to assert or imply any limitation with regard to the environments in which the present invention may be implemented. Many modifications to the depicted environments may be made without departing from the spirit and scope of the present invention.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 105. For example, data processing system 100 may be an IBM eServer™ system, a product of International Business Machines Corporation of Armonk, N.Y. Also connected to system bus 105 is memory cache 106, which provides cache memory and an interface to system memory 107. I/O bus bridge 108 is connected to system bus 105 and provides an interface to I/O bus 109. I/O bus 109 connects the I/O bus bridge 108 to a plurality of I/O devices, 110, 111, 112, and 113. Data processing system 100 may be implemented using various commercially available computer systems. For example, data processing system 100 may be implemented using IBM eServer™ pSeries™ Model 930 system available from International Business Machines Corporation.

Those of ordinary skill in the art will appreciate that the hardware depicted in FIG. 1 may vary across a wide range of actual designs. The depicted example is not meant to imply architectural limitations with respect to the present invention.

With reference now to FIG. 2, a block diagram of an exemplary logically partitioned platform is depicted in which the present invention may be implemented. The hardware in the logically partitioned platform 200 with partitions 203, 205, 207, and 209, may be implemented as, for example, data processing system 100 in FIG. 1. Logically partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously running on platform 200. These operating systems may be implemented using the Linux operating system and are designed to interface with a hypervisor. Operating systems 202, 204, 206, and 208 are located in partitions 203, 205, 207, and 209, respectively.

Partitioned hardware 230 includes a plurality of processors 232-238, a plurality of system memory units 240-246, and a plurality of input/output (I/O) adapters 248-262. Partitioned hardware 230 also includes service processor 290, which may be used to provide various services, such as processing of errors in the partitions. Each of the processors 232-238, memory units 240-246, and I/O adapters 248-262 may be assigned to one of multiple partitions within logical partitioned platform 200, each of which corresponds to one of operating systems 202, 204, 206, and 208.

The hypervisor 210 performs a number of functions and services for partitions 203, 205, 207, and 209 to create and enforce the partitioning of logical partitioned platform 200. Hypervisor software is available from many companies including the International Business Machines Corporation. Thus, hypervisor 210 allows the simultaneous execution of independent OS images 202, 204, 206, and 208 by virtualizing all the hardware resources of logical partitioned platform 200. Operations of the different partitions may be controlled through a hardware management console, such as hardware management console 280.

FIG. 3 shows an exemplary cluster of computing systems suitable for implementing the present invention. The cluster 300 consists of a router and work-distribution device 301 connected by the network links 302 to computing systems 303, 304, 305, and 306, each running an operating system image, 307, 308, 309, and 310. Each computing system also contains one or more processors, shown here as 311-312, 313-314, 315-316 and 317-318, whose frequencies and voltages may be scaled in accordance with the invention.

An operating system may control power and temperature of the processors it uses by scheduling software threads, processes, tasks, or jobs to the hardware processors and threads. In contrast, the present invention provides a different form of scheduling that schedules the voltage and frequency of the processors in the system based on two criteria. The first criterion is a prediction of the processor demand from the work currently scheduled by the operating system on the processor. The second criterion is a system-wide constraint on the total power budget allocated to processors. Based on these criteria, low-level code sets the frequency and voltage of the processors in the system to match what the operating system is currently running on them.

In an exemplary embodiment, this low level scheduling is implemented by two bodies of code. The scheduling logic is a user-level daemon process that collects performance measurements of the behavior of the processors based on the readings of their performance counters and using the power constraint computes the frequency and voltage to be assigned to each processor. The second body of code is low-level operating system or hypervisor code that provides the mechanism for collecting the performance counter data and sets the appropriate voltage and frequency for each processor.

Thus, the exemplary aspects of the present invention provide an opportunity to reduce the performance loss caused by a reduction in the power budget. The frequency and voltage scheduling of the present invention uses the execution characteristics of the work currently running on each processor of a system or cluster to predict the performance of the work at the available frequency settings. The scheduling mechanism then selects the lowest frequency for the processor that provides essentially all of the available performance of the work. It then ensures that the frequency fits within the available global power budget and, if not, reduces the frequency so that it does.

Figure 4:
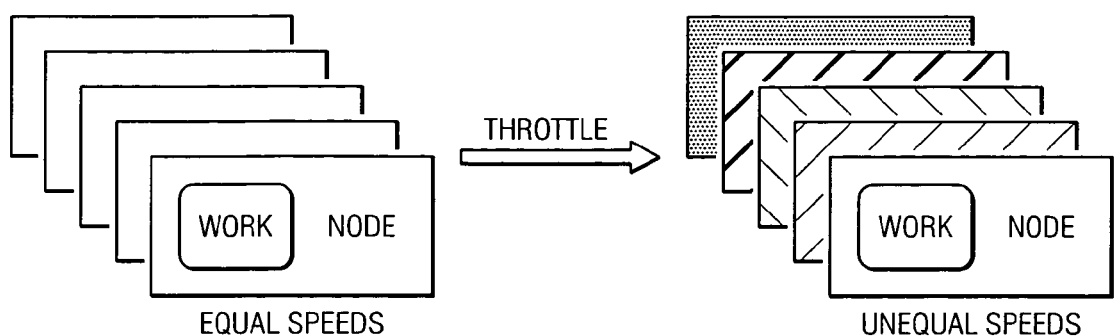
FIG. 4 illustrates an example cluster data processing system in which work is scheduled among a plurality of nodes and nodes are throttled in accordance with an exemplary embodiment of the present invention.

FIG. 4 illustrates the results of the operation of the invention on an example cluster data processing system in which work is assigned to a plurality of nodes and the processing speed and power consumption of the nodes are controlled in accordance with an exemplary embodiment of the present invention. In this example, a node may be, for example, a single processor, a logical partition within a logically partitioned data processing system, or a data processing system within a server cluster. More particularly, power consumption may be controlled by scaling the frequencies and voltages of the processors on the nodes, resulting in the plurality of nodes running at unequal speeds.

Power throttling by means of frequency and voltage scaling may cause performance loss. Therefore, there is a need to limit scaling and to predict when it may be necessary. Workload migration or balancing is difficult and expensive, especially on clusters. Due to the overhead in migrating workload from one server to another, it is best to avoid it.

Power consumption must stay below constraints with minimum performance loss. The average power consumption should be as low as possible with no performance impact.

On a system or cluster whose processors support dynamic frequency and voltage scaling to different values, the environment needs a mechanism to determine what frequency and voltage to assign to each processor. The present invention provides a methodology for predicting the performance impact of the different possible frequency settings, given counts of the cache and memory accesses or the number of processor cycles spent doing them, and then using the predictions to guide the assignment of frequencies and voltages in order to meet power constraints and reduce average power dissipation.

Workloads often cannot make use of all of the available frequency due to the latencies associated with cache and memory accesses. This phenomenon is referred to here as performance saturation. The intuition is that many programs obtain a limited benefit from increasing processor frequency due to the slow speed of memory relative to the processor. Thus, at some point the speed of a program making memory references is limited by the speed of the memory. The ratio of memory-intensive to CPU-intensive work in a workload determines the saturation point as illustrated for a simple program by FIG. 5.

Earlier work demonstrates that workloads vary in their level of memory intensity, both between different workloads and over their execution lifetimes. See R. Kotla, et al.; "Characterizing the Impact of Different Memory-Intensivity Levels"; IEEE 7$^{th}$ Annual Workshop on Workload Characterization (WWC-8); October, 2004, which is herein incorporated by reference. Given that secondary cache and memory performance are unaffected by processor frequency scaling, memory-intensive workloads exhibit performance saturation at a characteristic frequency related to their level of memory intensity. Raising the frequency above the saturation point yields essentially no further benefit in performance.

Figure 5:
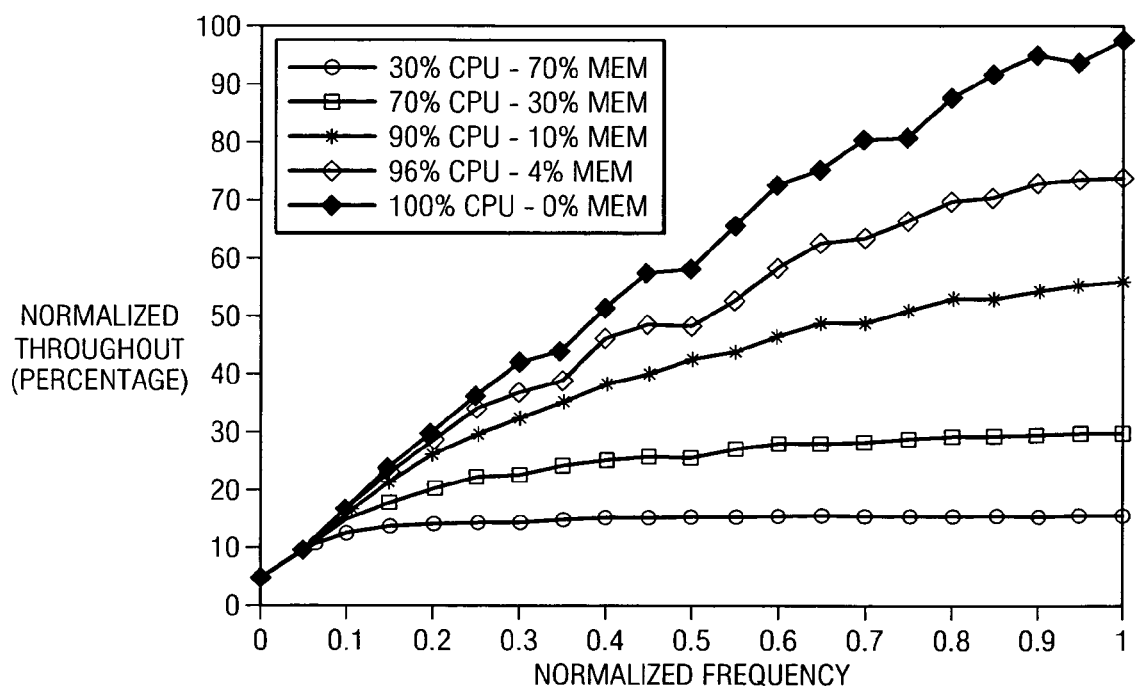
FIG. 5 illustrates the impact of processor and memory balance at different frequencies.

FIG. 5 illustrates the impact of processor and memory balance at different frequencies. More particularly, FIG. 5 illustrates that performance saturation allows the frequency to be reduced without a noticeable impact on application performance. Even when the power constraint is severe enough to require some performance penalty, it is generally possible to take advantage of performance saturation to minimize the overall performance penalty of the power-management action.

Workload diversity and the existence of different phases within a workload are well known and often used phenomena. Given an initial assignment of work to processors and strong or complete affinity of work to its originally assigned processors, it is reasonable to suppose systems and clusters often exhibit an overall diversity of behavior. The work running on some processors is more memory-intensive than the work running on other processors.

Unless the system explicitly load balances the memory intensity across the processors, it is still very likely that the system shows different cache and memory access rates on different processors. In clusters, where load balancing is difficult and expensive, if possible at all, diversity is even more common and more likely to persist over time. The tendency to assign work in a cluster by tiers, where some machines run a web server, some run processing logic, and some run a database, increases the level of diversity and stabilizes the phenomenon over time. The approach of the present invention uses the aggregate behavior of all applications on a given processor node, but workload diversity across processors is still observed.

Since processors typically offer only a fixed, small set of operating frequencies, predicting the performance impact on the current workload on a processor, in terms of its effect on the observed instructions per cycle (IPC), is a matter of calculating a projected IPC at each available frequency. Existing processor hardware, such as that found in the IBM Power4™, has performance counters that a scheduling mechanism may use to gather the number of accesses to each level of the memory hierarchy in an interval of time. To do the necessary IPC projection, the performance model used here breaks the IPC into frequency-dependent and frequency-independent components. In the following, α is the IPC of a perfect machine with infinite L1 caches and no stalls. α is a constant that takes into account both the instruction-level parallelism of the workload and the processor resources available to extract it.

$$IPC = \frac{\text{Instructions}}{\text{Cycles}}$$

$$= \frac{Instr}{C_{stall} + C_{inst}}$$

$$= \frac{1}{\frac{1}{\alpha} + \frac{C_{other\_stalls}}{Instr} + \frac{1}{Instr}}$$

$$(N_{L2}T_{L2\_stalls} + N_{L3}T_{L3\_stalls} + N_{mem}T_{mem\_stalls}) * f_{proc}$$

Each $N_x$ is a count of the number of occurrences of a particular type of cache or memory reference, as provided by the performance counters, and each $T_x$ is the time consumed by each reference. $T_x$ is predetermined for the particular processor by measurement of memory latencies and is assumed constant for simplicity. In reality, this is not true and is a source of error, but in practice it does yield a reasonable approximation for the purpose of frequency and voltage scheduling. Two different possible approaches have been investigated if it is deemed necessary to remove this assumption. The first approach involves taking measurements at two separate frequencies. This technique is used in the invention described in related and co-pending U.S. patent application Ser. No. 11/044,607, filed Jan. 27, 2005, which is herein incorporated by reference. The second approach instead uses both best and worst case latencies to provide best- and worst-case bounds on performance at each frequency. When implementing this method, the following computations are extended in the obvious way to yield two, bounding performance predictions.

At any given frequency, the equation above can be used to predict the IPC at another frequency given the number of accesses at the various levels in the memory hierarchy as well as the actual time it takes to complete the reference. This provides a mechanism for identifying the performance loss of a processor. As expected, the more memory-intensive a workload is, as indicated by the high memory subsystem references, the more feasible it is to lower the frequency to save power without impacting the performance. Once the frequency is lowered, it becomes possible to lower the voltage since the lower frequency allows correct operation at a lower voltage.

The scheduling algorithm uses the predicted IPC and the frequency used in the prediction to calculate the performance impact of running at that frequency. The following equations calculate the performance difference, PerfLoss(f, g) between the workload at the current frequency g and at the target frequency f. Values of PerfLoss(f,g) greater than 0 indicate a performance gain while those less than 0 show a performance loss.

$$Perf(f) = IPC(f) * f$$

$$PerfLoss(f, g) = \frac{Perf(f) - Perf(g)}{Perf(f)}$$

To schedule frequencies and voltages based on a power constraint, the scheduler must first convert the power value to corresponding frequency and voltage values. To simplify the analysis, as well as for intuitive reasons, the selection of the voltage once the frequency is determined is by the minimum voltage that can reliably support the frequency of interest.

The equation $P=CV_{dd}^2 f + \beta V_{dd}^2$ gives the power as a function of frequency and voltage. C is the capacitance, and $\beta$ is process- and temperature-dependent. The first term is the active power while the second is the static power, due primarily to leakage. To determine the maximum frequency that the processor can use and still meet a power constraint, $P_{max}$, one can substitute $P_{max}$ for P and V(f) for $V_{dd}$ and solve for f. This maximum value is denoted by $F_{max}$.

A more typical computational approach is to calculate in advance the power associated with each available frequency setting and its related voltage. This calculation ignores clock gating, but it provides an upper bound on power. When selecting a frequency for a particular maximum power, the system can then just select the highest frequency that yields a power value less than the maximum.

Since the scheduler is scheduling voltages and frequencies across a set of processors, the power calculation must be extended to calculate an aggregate frequency representing the total frequency limit of the system. This translates the power constraint for the whole system or cluster into a frequency constraint. The frequency constraint then becomes the total frequency budget, and the scheduling mechanism sets the frequencies of the individual processors so that they sum to a value that is less than or equal to the frequency budget.

A scheduler may calculate the frequency setting for each processor that yields the lowest power under the constraints of the maximum total frequency and a bound $\epsilon$ on the performance loss. If both constraints cannot be met, the scheduler must meet the power constraint while coming as close to the performance constraint as possible. For simplicity, the scheduling mechanism described here operates in two passes. A clever implementation can collapse these into a more efficient single pass scheduler.

Figure 6:
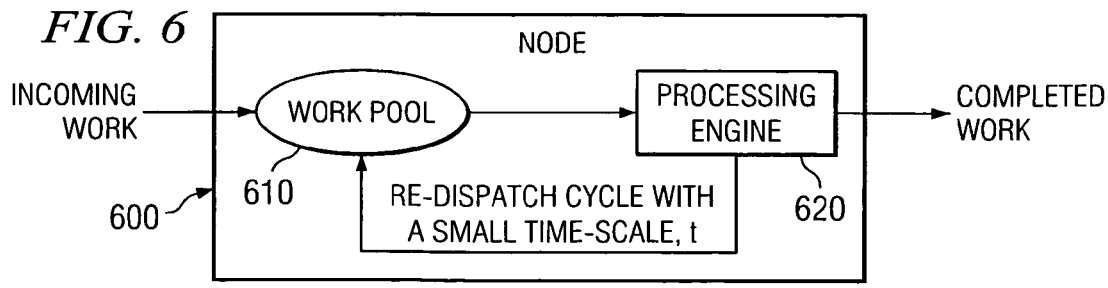
FIG. 6 depicts a workload model for a node in a cluster environment in accordance with an exemplary embodiment of the present invention.

FIG. 6 depicts a workload model for a node in a cluster environment in accordance with an exemplary embodiment of the present invention. Node 600 receives incoming work into work pool 610. Processing engine 620 receives work from work pool 610 and outputs completed work. Processing engine 620 may re-dispatch work to work pool 610 with a cycle having a small time scale, t.

Node 600 may be, for example, a single processor in a symmetric multiprocessing (SMP) system, a logical partition within a logically partitioned data processing system, a data processing system within a server cluster, or the like. Possible workloads may include, for example, middleware running transactions, a media service with different numbers of types of streams, or high performance computing jobs.

In accordance with a preferred embodiment of the present invention, a mechanism is provided for scheduling frequencies and voltages rather than work. Much less overhead is involved in scheduling frequencies and voltages in a cluster environment. No operating system scheduler support is needed. Furthermore, the mechanism of the present invention provides a simple, low-level scheme for managing power consumption, even for heterogeneous clusters or SMP data processing systems.

Figure 7:
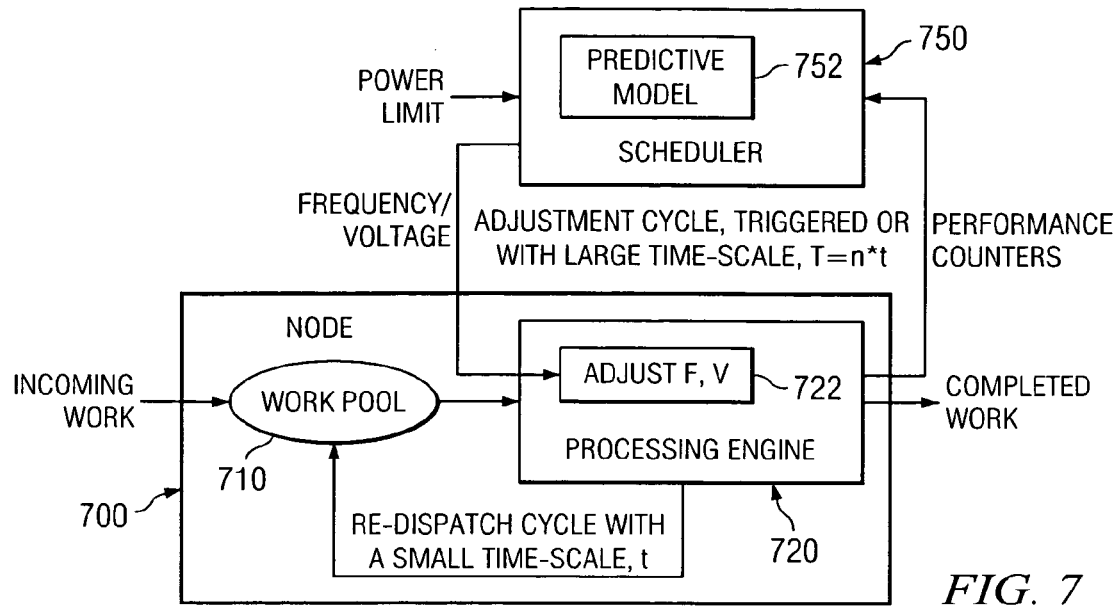
FIG. 7 depicts an overall structure of a frequency and voltage scheduling power management system in accordance with an exemplary embodiment of the present invention.

FIG. 7 depicts an overall structure of a frequency and voltage scheduling power management system in accordance with an exemplary embodiment of the present invention. FIG. 7 provides a simplified view showing only a single processor of an SMP data processing system or a single node of a cluster even though the power management system schedules frequency and voltage across all processors and nodes. However, the power limit is global. The system uses power status and measurement data to determine the value of the limit and to monitor compliance with it.

Node 700 receives incoming work into work pool 710. Processing engine 720 receives work from work pool 710 and outputs completed work. Processing engine 720 may re-dispatch work to work pool 710 with a cycle having a small time scale, t. Node 700 may be, for example, a single processor in a symmetric multiprocessing (SMP) system, a logical partition within a logically partitioned data processing system, a data processing system within a server cluster, or the like. Possible workloads may include, for example, middleware running transactions, a media service with different numbers of types of streams, or high performance computing jobs.

In accordance with an exemplary embodiment of the present invention, processing engine 720 also reads performance counters from the processor(s) within node 700 and provides the performance counters to scheduler 750. Changes to frequency and voltage are sent from scheduler 750 to processing engine 720, which includes a mechanism 722 for adjusting frequency and voltage of the processor(s) of node 700. Scheduler 750 includes predictive model 752 for predicting whether the processing environment of node 700 is CPU-intensive or memory-intensive and, thus, whether and what change in frequency and voltage may be necessary or desired.

There are three possible triggers for changing frequency and voltage. First, the global power limit may change, due, for example, to the loss or the restoration of a power supply in the system. Second, there may be a periodic readjustment of the voltage and frequency based on the expiration of a timer. Although the period of the timer, T, is a parameter to the mechanism, it is, for convenience, selected to be a multiple of the dispatch period, t, of the nodes. Generally, the multiplier, n, is fairly large to help stabilize the scheduler. It also helps amortize the overhead of both the inter-processor communication required and the frequency and voltage changes. Third, there are processors that idle by running a tight, CPU-intensive loop rather than by halting. The Power4+™, for example, is such a processor.

The scheduling mechanism runs the CPU-intensive idle loop at the highest frequency allowed by the power constraints. To avoid this problem, scheduler 750 needs input from the firmware or operating system indicating the processor is idle. On receiving this signal, scheduler 750 ignores predictive model 752 and sets the frequency and voltage to their minimum values. When a processor exits from the idle loop, an idle detection mechanism (not shown) sends scheduler 750 another signal indicating that the processor is no longer idle and that normal operation should resume. If the processor idles by halting and has a performance counter that tracks the number of halted cycles, then there is no need for an idle indicator, and the third triggering mechanism is never used.

The acceptable performance loss, $\epsilon$, is also a parameter to the algorithm. When overall power is not tightly constrained, $\epsilon$ bounds the performance loss of the workload on each processor. Due to the relatively small number of possible frequency settings, it is not always possible to achieve very small values of $\epsilon$, and its value must be greater than the minimum performance step caused by a change in frequency and voltage.

To determine the proper frequency setting, scheduler 750 first calculates an ideal frequency, $f_{ideal}$, which is intuitively the frequency that the program should use given its behavior. The calculation of $f_{ideal}$ is based on the two limiting cases, CPU-intensive and memory-intensive, from the prediction equation discussed above.

If the possible frequency settings are $f_0, \ldots, f_{max}$, then the scheduling calculation sets $f_{ideal}$ according to the following equations. It then uses $f_{ideal}$ to calculate the performance target.

$$f_{ideal} = f_{max} \text{ if } IPC \geq 1; \text{ otherwise,}$$

$$\frac{\text{Instructions} * Perf(t, f_{\max}) * (1 - \varepsilon)}{\alpha * \text{Instructions} - \alpha * T_{\text{mem\_all}} * Perf(t, f_{\max}) * (1 - \varepsilon)},$$

where $$T_{mem-all} = N_{L2}T_{L2} + N_{L3}T_{L3} + N_{mem}T_{mem}.$$

The value of $\epsilon$ is used to bound the amount of performance lost by reducing the frequency. The goal of the scheduler is to have $PerfLoss(f_{ideal}, f_{selected}) < \epsilon$. For each possible frequency setting, the algorithm calculates the predicted IPC of the aggregate workload on that processor at that frequency. The algorithm then computes the performance loss versus the performance at $f_{ideal}$ and chooses the smallest value that still has a performance loss of less than $\epsilon$. Alternatively, the mechanism may compute the performance at $f_{max}$ rather than at $f_{ideal}$ and avoid calculating $f_{ideal}$.

The data used in calculating the performance loss is aggregate data across all of the programs running on a particular processor. Scheduler 750 does not explicitly take multiprogramming or program phase transitions into account. This simplification comes at some cost in accuracy. The use of power measurement to monitor the total power consumption ensures that the system stays below the absolute limit. If necessary, the global limit may contain a margin of safety that forces a downward adjustment of frequency and voltage before any hardware-related, critical power limits are reached.

An example frequency and voltage scheduling algorithm is as follows:

(1) $F_{max}$=maximum total frequency allowed by $P_{max}$.
(2) Let $F=f_0, f_1, \ldots, f_{k-1}$ be the possible processor frequencies in ascending order.
(3) for n in Nodes
    for p in Processors(n)
        calculate $f_{ideal}$
        for all $f_i$ in F
            calculate $IPC(f_i)$
        $f_{n,p}$=min $f_i$ in F
such that $PerfLoss(f_{ideal}, f_i) < \epsilon, i < k-1$,
        otherwise $f_{k-1}$
(4) while $\Sigma f_{n,p} > F_{max}$
    select n,p with smallest $PerfLoss(f_{less})$ where
    $f_{less}$ is the next frequency less than $f_{n,p}$ in F.
(5) for n in Nodes
    for p in Processors(n)
        $v_{n,p}$=MinVoltage($f_{n,p}$)

Step 1 computes the maximum aggregate frequency of all processors across all nodes. Step 3 loops through all of the processors of the system, calculating all of the predicted IPC values based on the target frequency settings and the observed values of the performance counters. The frequency selected is the lowest one that keeps the performance loss versus $f_{ideal}$ to within $\epsilon$. Although one commonly thinks of downward adjustments in frequency, step 3 may, in fact, adjust frequency upward if a higher value is required to meet the performance loss criterion. At step 4, the algorithm adjusts the frequencies downward, if necessary, until the power constraint is met. The algorithm does the downward adjustments that have the least impact on performance. Finally, at step 5, the algorithm relies on a table look-up to determine the lowest voltage setting allowed for the selected frequency of each processor. It may be the case that the voltage table is different for each processor if there is significant process variation among them.

The frequency and voltage scheduler reacts to the observed behavior of the workloads assigned by the operating system or cluster management software to each processor. On standard SMP operating systems, the kernel does some form of load balancing. Clusters also typically try to balance the load as well through clever initial assignments of work to nodes. However, there is nothing in the frequency and voltage scheduler that attempts to balance the system. The frequency and voltage scheduler only attempts to minimize total power within the constraints of maximum power and performance.

Figure 8:
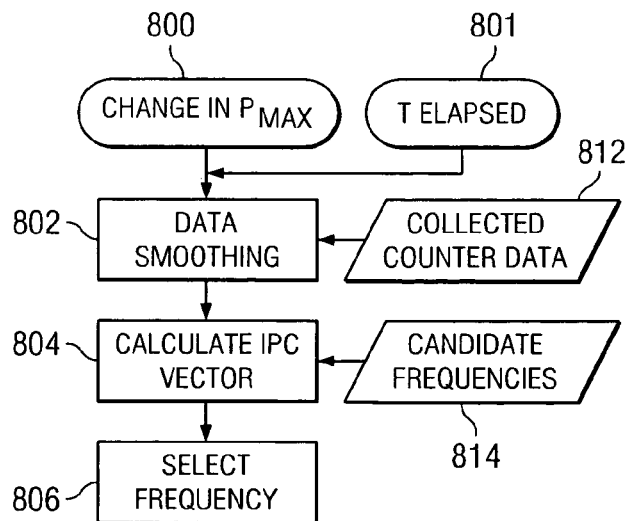
FIG. 8 is a flowchart illustrating the operation of a power management system for providing an initial, performance-sensitive setting in accordance with an exemplary embodiment of the present invention.

FIG. 8 is a flowchart illustrating the operation of a power management system for providing an initial, performance-sensitive setting in accordance with an exemplary embodiment of the present invention. The operation of FIG. 8 is performed for all processors on all nodes. Operation begins in response to a change in maximum power, $P_{max}$, (block 800) or expiration of a timer, the period of which is T, (block 801) that triggers periodic readjustment of the voltage and frequency.

Data smoothing (block 802) is performed on collected counter data 812. Then, the power management system calculates the predicted instructions per cycle (IPC) vector (block 804) for the candidate frequencies 814. Next, the power management system selects a frequency (block 806), the lowest frequency that keeps the performance loss within ϵ and corresponding voltage for each processor. Thereafter, operation ends.

Figure 9:
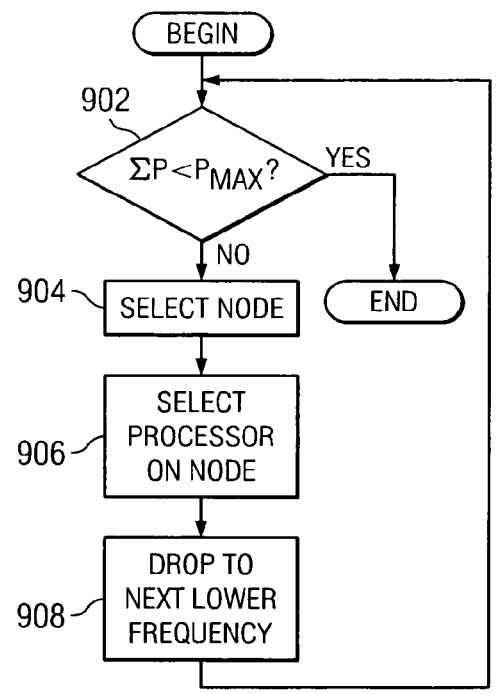
FIG. 9 is a flowchart illustrating the operation of a power management system for ensuring that global, local power constraints are met in accordance with an exemplary embodiment of the present invention.

FIG. 9 is a flowchart illustrating the operation of a power management system for ensuring that global and local power constraints are met in accordance with an exemplary embodiment of the present invention. The operation of FIG. 9 is performed every adjustment cycle. Operation begins and a determination is made as to whether the total power of all processors, $\Sigma P$, is less than the maximum power, $P_{max}$ (block 902). If the total power of all processors is less than the maximum power constraint, operation ends. Note that in the exemplary embodiment, the actual comparison is of frequencies using the substitution of frequency for power described above.

If the total power of all processors is not less than the maximum power in block 902, the power management system selects a node (block 904), selects a processor on the selected node (block 906), and drops the selected processor to a next lower frequency (block 908). Thereafter, operation returns to block 902. The selection is done by choosing the node and processor that experiences the least performance loss at the next lower frequency. The operation of blocks 904-908 repeats, selecting a next processor and/or a next node, until the total power is below the maximum power constraint.

Thus, the present invention solves the disadvantages of the prior art by identifying an appropriate frequency for the aggregate workload on each processor and changes it appropriately. The mechanism of the present invention then sets the minimum voltage that supports the selected frequency. Should the aggregate power still exceed the power limit, the mechanism then systematically reduces the power, while minimizing the performance loss, to get under the power limit.

There are several main advantages to scheduling frequencies and voltages rather than work. First, it avoids the overhead of moving work from one processor to another. Second, it overcomes the difficulty generally experienced in cluster environments that work migration is difficult or impossible. Third it allows systems vendors to implement necessary power control mechanisms without requiring changes to the operating system's scheduler. This is crucial in many environments since the vendor either does not have the source for the operating system or encounters difficulties and delays in getting the necessary changes accepted by a larger community. In addition, scheduling frequencies and voltages to processors as proposed in this paper does not depend on a detailed analysis of program phases and execution sequences. Instead, it relies on data from the performance counters on all of the processors in the system or cluster. While this sacrifices some accuracy, its simplicity makes it attractive, especially when the primary goal is to ensure that power remains under some maximum.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for scheduling voltages and frequencies to minimize overall energy consumption of a computing system with bounded loss of system performance and to keep power dissipation under a fixed limit while minimizing performance loss, the method comprising:
   collecting performance data about a workload executing on each processor within a plurality of processors of the computing system;
   calculating a processor and memory intensity of the workload on each processor within the plurality of processors based on the collected performance data;
   calculating a predicted performance of the workload on each processor within the plurality of processors based on execution characteristics;
   calculating a predicted performance loss, based on the predicted performance at each of a plurality of available processor frequencies relative to a performance predicted for a maximum available frequency of all processors within the plurality of processors in the computing system; and
   selecting a lowest available frequency for each processor within the plurality of processors such that the predicted performance loss at the selected lowest available frequency versus the maximum available frequency is less than a performance loss bound.

2. The method of claim 1, wherein selection of the lowest available frequency for each processor is further constrained so that a total of the frequencies selected across all processors within the plurality of processors in the computing system is less than a predetermined value, wherein the predetermined value is calculated based on a change in maximum power allocated for all the processors within the plurality of processors in the computing system.

3. The method of claim 2, wherein the total frequency and the maximum power allocated change responsive to externally signaled conditions.

4. The method of claim 1, wherein the performance data includes counts of accesses to each level of a memory hierarchy of the computing system, processor cycles, and instructions completed where said counts are collected from processor performance counters, wherein calculating the processor and memory intensity of the workload includes:
   determining the memory intensity of the workload based on the counts of accesses to each level of the memory hierarchy and constant latencies for each level of the memory hierarchy; and
   determining the processor intensity of the workload based on the counts of processor cycles and instructions completed.

5. The method of claim 1, wherein the performance data includes counts of stall cycles to each level of a memory hierarchy of the computing system, processor cycles, and instructions completed that are collected from processor performance counters, wherein calculating the processor and memory intensity of the workload includes:

determining the memory intensity of the workload based on the count of stall cycles to each level of the memory hierarchy; and determining the processor intensity of the workload based on the counts of processor cycles and instructions completed.

6. The method of claim 1, wherein the predicted performance loss at each frequency is calculated using both a maximum and a minimum of memory latencies to generate two performance predictions for each frequency to determine a range of performance loss for each frequency and wherein a frequency to use when the ranges of performance loss overlap for two or more frequencies is selected by choosing the highest overlapping frequency in a lowest range of frequencies that meets a performance constraint.

7. The method of claim 1, further comprising:

reducing processor frequencies one processor at a time within the plurality of processors until a total power is below the maximum power allocated for all the processors, wherein the one processor at a time is selected by choosing a processor that experiences a least performance loss at a next lower frequency.

8. The method of claim 1, further comprising:

selecting the lowest available frequency for a given processor within the plurality of processors if the given processor is in an idle state that operates in a manner such that the performance data collected indicate high processor intensity for the given processor, overriding any other frequency selection; and reverting to standard operation when the given processor exits the idle state.

9. The method of claim 1, wherein the computing system is one of a cluster of data processing systems, a multiple processor data processing system, or a logically partitioned data processing system.

10. The method of 1, further comprising:

selecting an operating voltage for each processor within the plurality of processors based on the selected frequency of the processor such that the selected voltage is a minimum voltage allowed for correct operation of the processor at that frequency.

* * * * *